March 19, 1957 F. PAULSMEIER 2,785,576
LINEAR ROLLER-TYPE RECIPROCATING DRIVE
Filed Aug. 24, 1953 2 Sheets-Sheet 1

INVENTOR
FRITZ PAULSMEIER

BY *Burgess and Dinklage*

ATTORNEYS

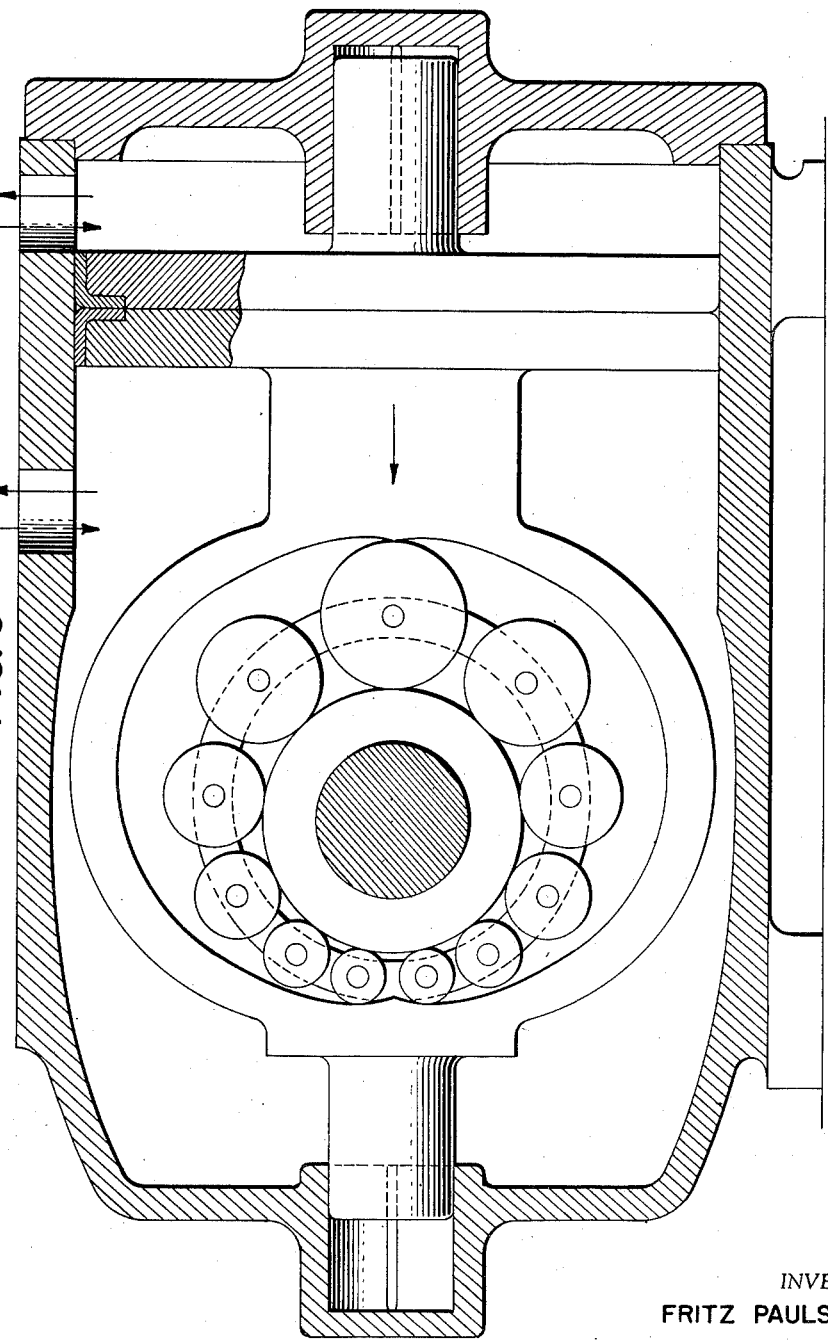

United States Patent Office 2,785,576
Patented Mar. 19, 1957

2,785,576
LINEAR ROLLER-TYPE RECIPROCATING DRIVE
Fritz Paulsmeier, Hamburg-Bergedorf, Germany Application August 24, 1953, Serial No. 376,171

3 Claims. (Cl. 74—52)

This invention relates to a linear roller-type reciprocating drive. Many devices, as, for example, reciprocating pumps, etc., require a linear reciprocating drive. Generally, the motors available deliver rotary motion and it becomes necessary to convert this rotary motion into reciprocating motion by means of eccentrics, crankshafts, etc. With these conventional, reciprocating drives, the number of strokes delivered per minute is equal to the R. P. M. of the driving engine in connection with a direct drive. For the reduction in the number of strokes per minute as compared to the R. P. M. which is often necessary, a special reduction transmission, such as belt drive or gears, is necessary.

Furthermore, in conventional drives for converting rotary to reciprocating motion besides the linear stroke, there is always effected lateral oscillation. Many devices, such as reciprocating pumps, require a straight linear reciprocating stroke which necessitates of pivoted crank shaft linkages, etc.

One object of this invention is a linear, roller-type, reciprocating drive, which will deliver a completely linear stroke without any lateral oscillations and which will effect a reduction in the number of strokes delivered per minute, as compared to the R. P. M. of the drive. These, and still further objects will become apparent from the following description, read in conjunction with the drawings, in which:

Fig. 1 diagrammatically shows a linear, roller-type reciprocating drive in accordance with the invention;

Fig. 3 shows the drive of Fig. 1 directly connected to a piston of a reciprocating pump.

The drive in accordance with the invention has a drive roller having a cylindrical periphery positioned in spaced relationship to an inner cam surface formed in a reciprocal driven member, the said surface being in the shape of intersecting circles forming opposed cusps at the points of intersection, the center of the drive roller being aligned with said cusps. A ring of rollers mounted in an annular cage surrounds the drive roller with each of the rollers of the ring in contact with the drive roller. The rollers are dimensioned and positioned in the cage so that the diameter increases in a direction half-way around the cage, and then decreases in the same direction around the other half of the cage. The rollers and the inner cam surface are so dimensioned that at least two rollers on opposite sides of the cage are always in contact with the inner cam surface.

Figure 1:
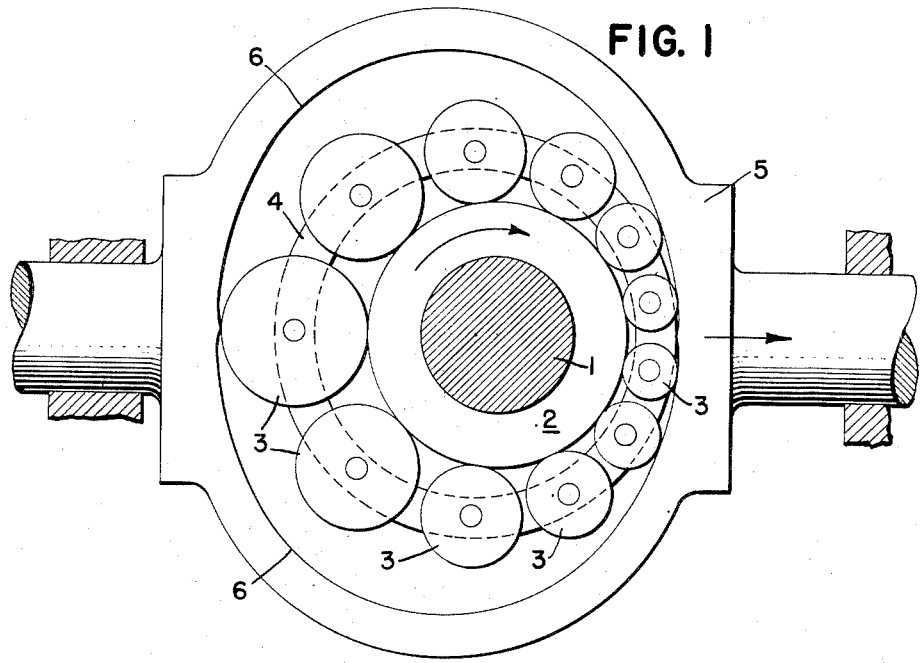
Figure 2:
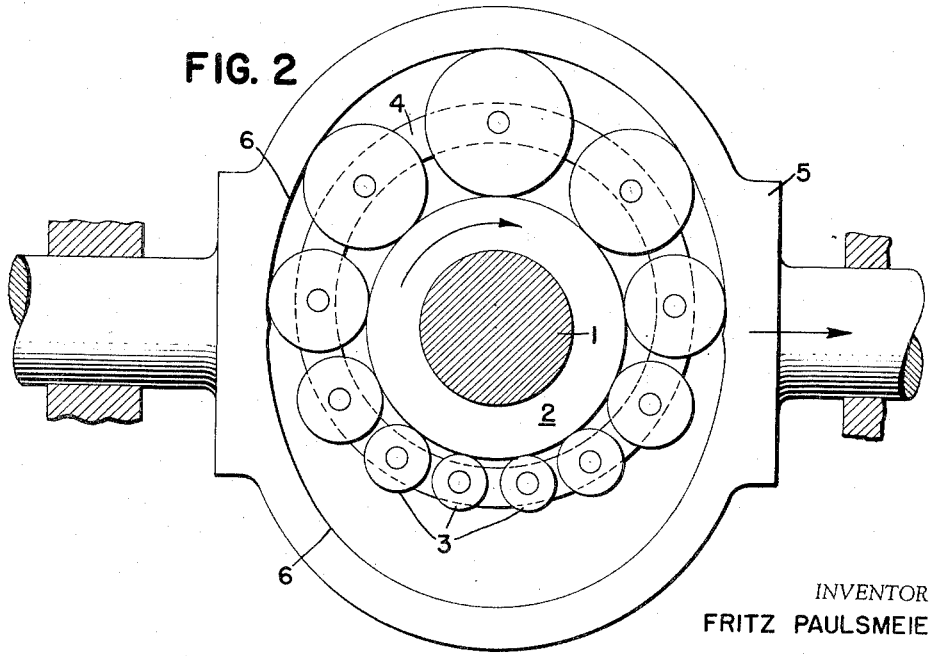
Fig. 2 shows the drive of Fig. 1 in a different position of rotation.

Referring to Figs. 1 and 2, a rotating shaft 1 connected to a suitable rotary drive motor, is connected to and rotates the drive roller 2. The drive roller 2 is eccentrically positioned within in spaced-relationship to the oval-shaped inner cam surface 6, defined by the slide block 5. A ring of rollers 3 of different diameters surrounds the drive roll 2 with each of the rollers of the ring in contact with the drive roller. The rollers 3 are rotatably mounted in a cage 4, which is annular in shape and which is freely rotatable. The diameters of the rollers 3 increase over half of the cage 4 and then decrease in the same direction over the other half. The rollers 3 and the inner cam surface 6 are so dimensioned that two rollers on opposite sides of the cage are always in contact with the narrowest portion across the inner cam surface. The oval-shaped inner cam surface 6 is also so dimensioned that the roller 3 of the largest diameter will contact or pass in proximity to its inner surface without exerting any forces in a vertical direction. The diameter across the narrowest portion of the oval-shaped inner cam surface is less than the diameter of the circle contacting and subscribing the ring of rollers. The diameter of the inner cam surface in its longest dimension is equal to two times the sum of the diameter of the largest roller and the radius of the drive roller.

During operation at all places where any of the rollers 3 simultaneously touch the inner drive roller 2 and the surrounding cam surface 6, a wedge angle is formed which is equal to the pitch of the spiral curve and is therefore smaller than the friction angle corresponding to the material.

In operation, the inner drive roller 2 is driven at a predetermined speed of rotation. Since the rollers 3 are in frictional contact with the drive roller 2, the same are caused to rotate. Due to the contact of some of the rollers 3 with the inner oval cam surface 6, the cage 4 with the ring of rollers is caused to rotate at a slower rotational speed than the drive roller 2. Due to the difference in size of the rollers 3, the slide block 5 is caused to reciprocate back and forth, but will not oscillate at all in the vertical direction, due to the clearance in the elongated portion of the inner oval cam surface 6. One stroke of the side block is obtained when the roller cage has made one revolution.

Since the stroke delivered is completely linear without any lateral oscillations, the drive may be directly rigidly connected, for example, to a reciprocating piston. In Fig. 6 such a connection is shown. The drive is connected rigidly and directly to the reciprocating piston 10. The piston 10 is directly connected to the slide block 5 by means of the connecting member 12. The other end of the slide block 5 is guided in the guide 11.

Since in the drive in accordance with the invention, the speed of travel is as uniform as possible between the points of reversal of reciprocating motion, the same may be used with great advantage with liquid pumps and allows the use of a relatively small pressure tank. The dead center times are very short and the variations in the liquid flow are only slight.

The drive, in accordance with the invention, allows the reduction of the speed of the stroke to the R. P. M. of the rotary drive of 1:2.5 to 1:5. It allows the greatest possible stroke within the smallest dimensions, and uniform stroke speeds between the reversal positions. The dead center time is relatively short. The drive further eliminates the need for eccentric connecting rods and requires the least possible amount of maintenance with the highest efficiency.

I claim:

1. Linear, roller-type, reciprocating drive comprising a slide block defining a substantially oval, inner cam surface, a drive roller positioned within said inner cam surface in spaced relation thereto, a ring of rollers mounted in a cage surrounding said drive roller with each roller in contact therewith, said rollers increasing in diameter around one side of said cage, and decreasing in diameter in the same direction around the other side thereof, said inner cam surface having its narrowest diameter substantially equal to the outer diameter of said ring of rollers, and having its greatest diameter at least equal to twice the sum of the diameter of the largest roller plus the radius of the drive roller.

2. Drive according to claim 1, in which said inner cam surface is so dimensioned that the roller of largest diameter is in contact therewith at any position of rotation of said cage.

3. Drive according to claim 1 in which said oval-shaped inner cam surface substantially has the shape of two intersecting circles.

References Cited in the file of this patent

UNITED STATES PATENTS

| | | |
|---|---|---|
| 605,845 | Belanger | June 21, 1898 |
| 1,568,290 | Morison | Jan. 5, 1926 |
| 2,427,253 | Browne | Sept. 9, 1947 |
| 2,532,992 | Browne | Dec. 5, 1950 |